United States Patent
Sato et al.

(10) Patent No.: US 8,736,909 B2
(45) Date of Patent: May 27, 2014

(54) IMAGE FORMING APPARATUS AND COMPUTER READABLE MEDIUM

(75) Inventors: Noribumi Sato, Saitama (JP); Mitsuru Iioka, Saitama (JP); Jun Koyatsu, Saitama (JP); Kaoru Yamauchi, Saitama (JP); Keiichi Okada, Saitama (JP)

(73) Assignee: Fuji Xerox Co., Ltd., Tokyo (JP)

(*) Notice: Subject to any disclaimer, the term of this patent is extended or adjusted under 35 U.S.C. 154(b) by 931 days.

(21) Appl. No.: 12/782,161

(22) Filed: May 18, 2010

(65) Prior Publication Data

US 2011/0080617 A1 Apr. 7, 2011

(30) Foreign Application Priority Data

Oct. 7, 2009 (JP) ................................. 2009-233449

(51) Int. Cl.
*H04N 1/40* (2006.01)
*H04N 1/407* (2006.01)
*H04N 1/409* (2006.01)
*H04N 1/00* (2006.01)
*H04N 1/32* (2006.01)
*H04N 1/58* (2006.01)
*G06T 1/00* (2006.01)

(52) U.S. Cl.
CPC ....... H04N 1/00838 (2013.01); H04N 1/32309 (2013.01); H04N 1/58 (2013.01); *G03G 2215/0158* (2013.01); *H04N 1/32144* (2013.01); *G06T 1/0021* (2013.01)
USPC ......... 358/3.28; 358/1.9; 358/3.26; 358/3.27; 358/518

(58) Field of Classification Search
CPC . H04N 1/58; H04N 1/00838; H04N 1/00867; H04N 1/00872; H04N 1/0087; H04N 1/032144; H04N 1/32149; H04N 1/32154; H04N 1/32203; H04N 1/32267; H04N 1/32288; H04N 1/32309; H04N 1/32315; H04N 1/3232; H04N 1/32331; H04N 1/32336; H04N 1/32341; H04N 1/323; G03G 2215/0158; G06T 1/0021; G06T 1/0028; G06T 1/005; G06T 2201/0051; G06T 2201/0064
USPC .......................... 358/1.9, 3.26–3.27, 533–536
See application file for complete search history.

(56) References Cited

U.S. PATENT DOCUMENTS 6,345,117 B2 * 2/2002 Klassen ........................ 382/167
6,763,122 B1 * 7/2004 Rodriguez et al. ............ 382/100

(Continued)

FOREIGN PATENT DOCUMENTS

JP A-2001-005245 1/2001
JP A-2003-500777 1/2003

(Continued)

*Primary Examiner* — Richard Zhu
(74) *Attorney, Agent, or Firm* — Oliff PLC

(57) ABSTRACT

According to an aspect of the invention, an image forming apparatus includes an image correction unit and a determination unit. The image correction unit inserts a new pixel between pixels forming image data with a plurality of pixels printed using a plurality of print color materials arranged in a main scanning direction in order to correct the image width in the main scanning direction. The determination unit determines whether or not the image data is specified for print with a dot representing given information superposed. When the determination unit determines that the image data is specified for print with the dot superposed, a prohibition unit included in the image correction unit prohibits insertion of the new pixel into a pixel string of a print color material of a similar color to the print color material for the dot.

2 Claims, 9 Drawing Sheets

(56) References Cited

U.S. PATENT DOCUMENTS

| | | | |
|---|---|---|---|
| 6,844,942 B2 * | 1/2005 | Rumph et al. | 358/1.9 |
| 6,987,585 B1 * | 1/2006 | Becker | 358/1.9 |
| 7,271,934 B2 * | 9/2007 | McElvain | 358/1.9 |
| 7,684,087 B2 * | 3/2010 | Yao | 358/3.26 |
| 7,710,609 B2 * | 5/2010 | McElvain | 358/3.27 |
| 7,724,393 B2 * | 5/2010 | Segawa et al. | 358/1.9 |
| 7,843,604 B2 * | 11/2010 | Higashiyama et al. | 358/1.9 |
| 2005/0246341 A1 * | 11/2005 | Vuattoux et al. | 707/9 |
| 2007/0297013 A1 * | 12/2007 | Nakagawa | 358/3.28 |

FOREIGN PATENT DOCUMENTS

| | | |
|---|---|---|
| JP | A-2004-030235 | 1/2004 |
| WO | WO 00/73981 A1 | 12/2000 |

\* cited by examiner

XX General Hospital
Department of XX
Interview Sheet

1. About your medical history
   XYZ ...
2. About allergy
   XYZ ...
3. ...
   ...
4. ...
   ...
5. ...
6. ...                    Transmit

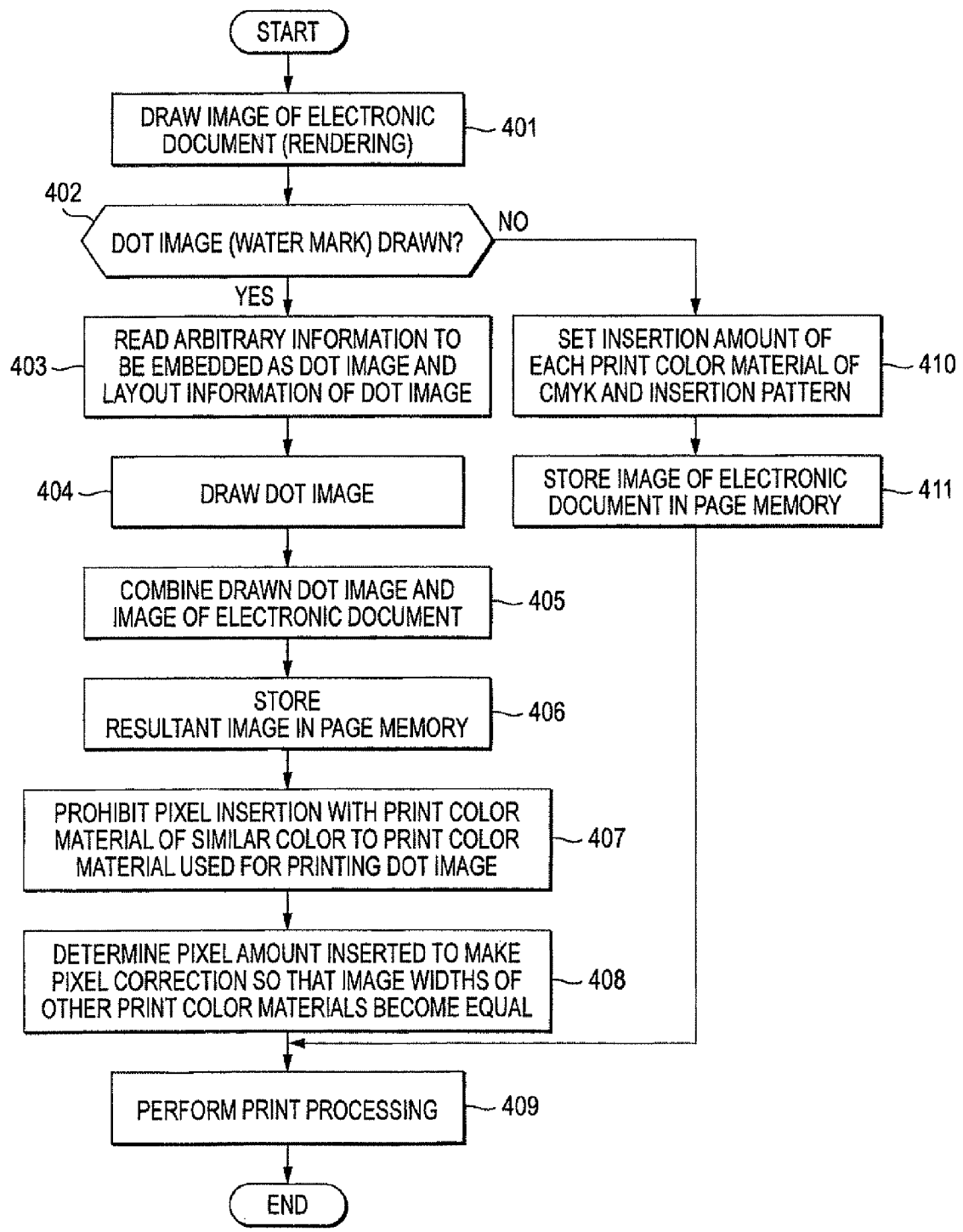

IMAGE FORMING APPARATUS AND COMPUTER READABLE MEDIUM

CROSS-REFERENCE TO RELATED APPLICATIONS

This application is based upon and claims priority under 35 USC 119 from Japanese Patent Application No. 2009-233449, filed Oct. 7, 2009.

BACKGROUND

Technical Field

This invention relates to an image forming apparatus and a computer readable medium.

SUMMARY OF THE INVENTION

According to an aspect of the invention, an image forming apparatus includes an image correction unit and a determination unit. The image correction unit inserts a new pixel between pixels forming image data with a plurality of pixels printed using a plurality of print color materials arranged in a main scanning direction in order to correct the image width in the main scanning direction. The determination unit determines whether or not the image data is specified for print with a dot representing given information superposed. When the determination unit determines that the image data is specified for print with the dot superposed, a prohibition unit included in the image correction unit prohibits insertion of the new pixel into a pixel string of a print color material of a similar color to the print color material used to print the dot, of pixel strings printed using a plurality of print color materials arranged in the main scanning direction.

BRIEF DESCRIPTION OF THE DRAWINGS

Exemplary embodiments of the invention will be described in detail based on the following figures, wherein:

FIG. 4 is a flowchart to show a flow of processing performed by the image forming apparatus in the exemplary embodiment of the invention;

DETAILED DESCRIPTION

Exemplary embodiments of an image forming apparatus and a pixel control program according to exemplary embodiment will be discussed in detail with reference to the accompanying drawings.

Exemplary Embodiment 1

Figure 1:
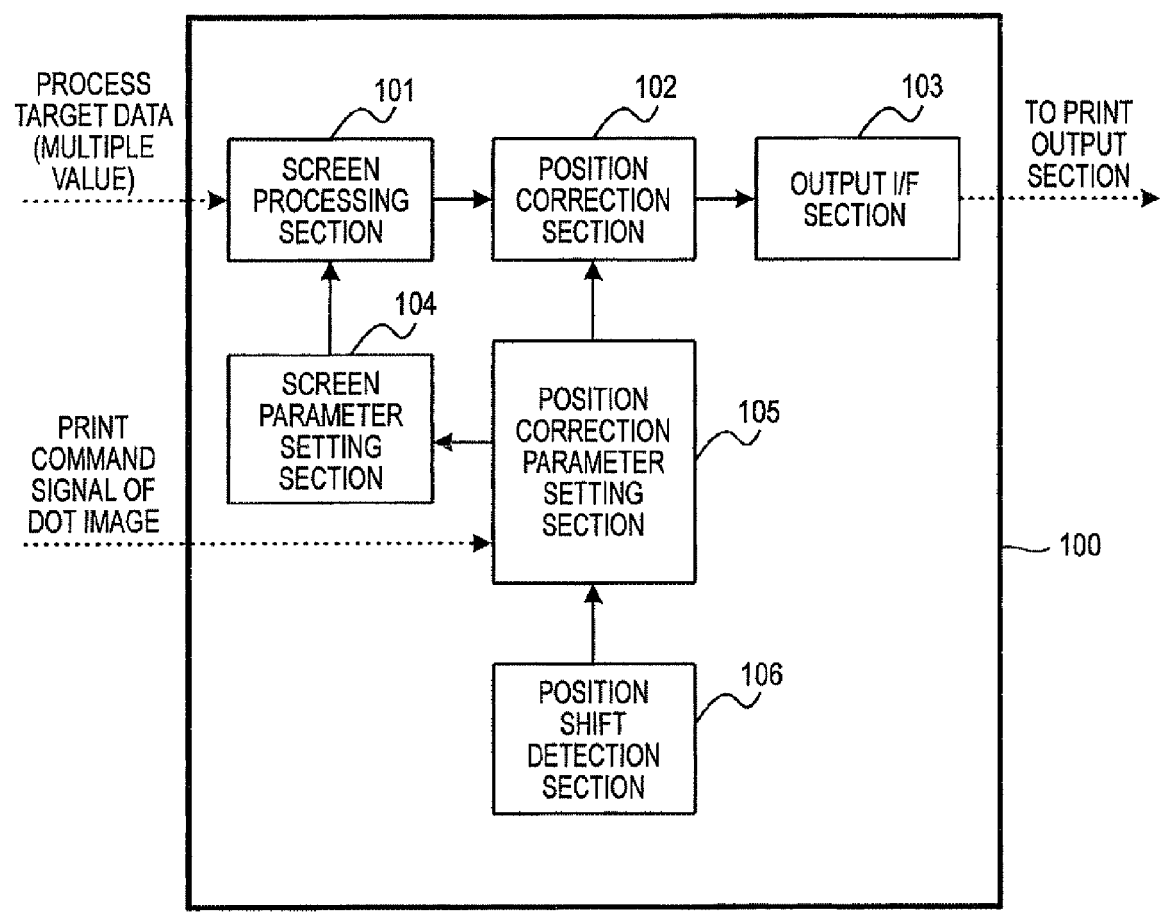
FIG. 1 is a drawing to show an example of an image processing section forming a part of an image forming apparatus to which an image forming apparatus and a pixel control program in an exemplary embodiment of the invention are applied.

FIG. 1 shows an example of an image processing section 100 which is a part of an image forming apparatus to which an image forming apparatus and a pixel control program in an exemplary embodiment of the invention are applied.

An image forming apparatus is made up of an input section, an image processing section, and a print output section. A processing request is input to the input section from a processing request terminal connected through a communication line and a processing request of process target data stored in a storage section is also input to the input section by operating a user interface by the user.

Process target data is specified in the processing request input to the input section and further a print command of a dot image representing any desired information using a plurality of dots may also be specified. The dot image may be called "watermark".

The information input to the input section is sent to the image processing section. At this time, the image processing section performs image processing of the process target data received from the input section and sends the process target data after subjected to the image processing to the print output section.

The print output section forms a latent image based on the process target data by exposing a charged photoconductive body (drum) of an image carrier from an exposure device, and deposits four print color materials of cyan (C), magenta (M), yellow (Y), and black (K) on the latent image. The photoconductive body is rotated, whereby the print color materials are moved to a belt of an intermediate transfer body and the print color materials on the intermediate transfer body are transferred to a print sheet of a print medium for print output.

At the time, the move direction of exposure light from the exposure device is called "main scanning direction" and the direction of the move direction of the photoconductive body and orthogonal to the main scanning direction is called "sub-scanning direction."

An image processing section 100 for receiving information from the input section is made up of a screen processing section 101, a position correction section 102, an output I/F section 103, a screen parameter setting section 104, a position correction parameter setting section 105, and a position shift detection section 106, as shown in FIG. 1.

The image processing section 100 receives process target data of a print processing target of information from the input section at the screen processing section 101 and receives a print command of a dot image at the position correction parameter setting section 105.

Figures 2A, 2B:
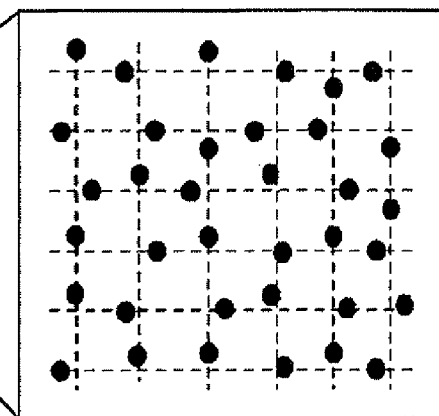
FIGS. 2A and 2B are drawings to show an example of a dot image.

FIGS. 2A and 2B show an example of the dot image.

FIG. 2A is a drawing of a combined print of a form image of an interview sheet of an example of the process target data and a dot image placed in accordance with a basic arrangement period and FIG. 2B is an enlarged drawing of a part of the dot image shown in FIG. 2A.

If a print command of a dot image is given in the input section, the image processing section 100 creates a document as shown in FIG. 2A.

The position shift detection section 106 shown in FIG. 1 detects the difference in the length in the main scanning direction (image width) in each print color material moved onto the intermediate transfer body as a position shift.

If the position shift detection section 106 detects a position shift with the image width varying for each print color material, the position shift detection section 106 notifies the position correction parameter setting section 105 of occurrence of position shift and the position shift amount.

Upon reception of the information from the position shift detection section 106, the position correction parameter setting section 105 finds a correction approximation function, etc., based on the information, thereby setting a correction parameter for correcting the position shift. That is, the position correction parameter setting section 105 sets the correction amount of the number of pixels requiring "addition" or "deletion" and a correction pixel position of adding a new pixel, a correction pixel position of deleting a pixel, etc., to make identical the image width in the main scanning direction of each print color material (hereinafter, simply called "image width") as correction parameters (correction information).

The position correction parameter setting section 105 further determines whether or not a print command of a dot image is received by the input section. If it determines that a print command of a dot image is received, the position correction parameter setting section 105 sets the correction amount in a print color material (any print color material of cyan, magenta, yellow, or black) of a similar color to the print color material used for a dot image preset to "zero."

That is, to print a dot image in black, gray, etc., setting is made for prohibiting correction of a pixel in the black print color material of a similar color to the print color material used to print the process target data and used to print the dot image.

Further, the position correction parameter setting section 105 sets the correction amount so that the image widths of print color materials other than the print color material with pixel correction prohibited, in the example, the image widths of the print color materials of cyan, magenta, and yellow become the same.

Similar colors refer to print color materials wherein color difference in CIE Lab color space, for example, is within a given range. Of course, similar colors are not limited to them and may be print color materials used to print a dot image having the same saturation and tint and different only in brightness within a given range.

Thus, when the position correction parameter setting section 105 sets the correction parameters of the correction amount, etc., the position correction parameter setting section 105 notifies the screen parameter setting section 104 of the setup correction amount of the correction parameter and notifies the position correction section 102 of the correction pixel position of the correction parameter.

The screen parameter setting section 104 sets a screen parameter based on the notified correction amount. The screen parameter is set information used for screen processing in the screen processing section 101.

When the screen parameter setting section 104 sets the screen parameter, it sends the setup screen parameter to the screen processing section 101.

If the process target data received from the input section is "multiple value," the screen processing section 101 converts it into "binary value" and performs screen processing of gradation representation of each pixel of the binary process target data using the screen parameter set by the screen parameter setting section 104.

The process target data after subjected to the screen processing is sent to the position correction section 102. Of course, if the received process target data is binary data rather than a multiple value, the screen processing is not performed and the data is sent to the position correction section 102.

Upon reception of the binarized process target data after subjected to the screen processing, the position correction section 102 corrects position shift of the process target data based on information of the correction pixel position of the correction parameter received from the position correction parameter setting section 105, thereby making correction of making identical the image widths of other print color materials than the similar color to the dot image.

That is, if a print command of a dot image is executed and the correction parameter is received, the position correction section 102 prohibits correction of a pixel by using a print color material of a similar color to the print color material for printing the dot image and makes correction so as to make identical the image widths based on other print color materials according to the correction amount of other print color materials than the print color material for printing the dot image specified by the correction parameter.

The correction processing is repeated as many as the number of lines in the main scanning direction in the process target data.

Figure 3:
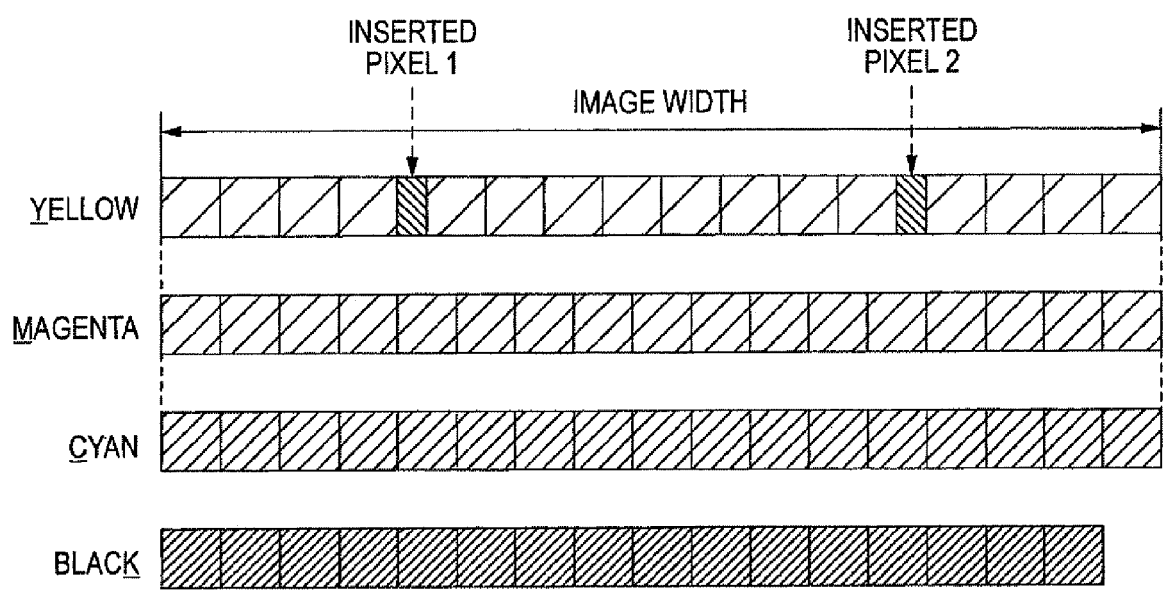
FIG. 3 is a drawing to show a state after correction of correcting an image width.

FIG. 3 shows the image width of each print color material of cyan, magenta, yellow, and black used to draw one line of the process target data in the main scanning direction.

FIG. 3 shows an example wherein when a black print color material is used to print a dot image, correction of adding a new black pixel of a similar color to the black print color material and correction of deletion of an already existing pixel are prohibited and correction is made so as to make identical the image widths of the print color materials of cyan, magenta, and yellow other than black.

As shown in FIG. 3, to make identical the image widths of the print color materials of cyan, magenta, and yellow, new two pixels are added to the yellow print color material.

When the position correction section 102 corrects the image width, the position correction section 102 sends the process target data after subjected to the correction to the output I/F section 103.

The output I/F section 103 converts the print target data into the output format in the print output section and then stores the process target data in a storage section of a work area and notifies the print output section that the process target data in the output format is stored in the work area.

Accordingly, the print output section prints out the process target data stored in the work area of the storage section in sequence.

FIG. 4 is a flowchart to show a flow of processing performed by the image forming apparatus in the exemplary embodiment of the invention.

In FIG. 4, when a print command is given, processing is started and an image of an electronic document of target data of print processing is drawing (rendering) (401).

At this time, whether or not print of a dot image (watermark) is specified in the print command is determined (402). If print of a dot image is specified (YES at 402), arbitrary information to be embedded as a dot image and layout information of the dot image are read (403).

The dot image is drawn based on the read information (404).

Subsequently, the drawn dot image and the electronic document are combined (405) and the resultant image is stored in page memory (406).

A correction parameter for prohibiting pixel insertion with a print color material of a similar color (to print out the dot image in black, "black") to the print color material used when printing out the dot image (in the example, "black") is set (407). Further, a correction parameter determining the pixel amount inserted to make pixel correction so that the image widths of other print color materials become equal is set (408).

Print output with position shift corrected using the correction parameters is performed (409).

On the other hand, if print output of a dot image is not specified (NO at 402), correction parameters of correction amounts, etc., of the print color materials of cyan, magenta, yellow, and black used for print output are set (410) and the image of the electronic document is stored in the page memory (411).

The image of the electronic document stored in the page memory is printed out based on the correction amounts of the print color materials and the correction parameters (409).

Exemplary Embodiment 2

In Exemplary Embodiment 1 described above, for each line of the process target data, a correction is made so as to make identical the image widths of other print color materials than the print color material used to print a dot image, of a plurality of print color materials used for print output for each line. In Exemplary Embodiment 2, the case where correction is made so as to make identical the image widths of lines will be discussed.

The general configuration in Exemplary Embodiment 2 is similar to that in FIG. 1 used for description of Exemplary Embodiment 1 and therefore Exemplary Embodiment 2 will be discussed using FIG. 1.

An image processing section 100 in FIG. 1 receives process target data of information from an input section and a print process target at a screen processing section 101 and receives a print command of a dot image at a position correction parameter setting section.

At this time, if a position shift detection section 106 detects a position shift caused by loss of the process target data in pixel units, the position shift detection section 106 notifies a position correction parameter setting section 105 of occurrence of position shift, the position shift amount of the number of lost pixels, and the pixel position in the main scanning direction where the position shift occurs.

When a print command of a dot image is given from the input section, the position correction parameter setting section 105 determines that the pixel correction position in each line in the main scanning direction of the process target data becomes an integral multiple (integer ratio, equal spacing) of the basic arrangement period of dot image based on information received from the position shift detection section 106.

Figures 5A, 5B:
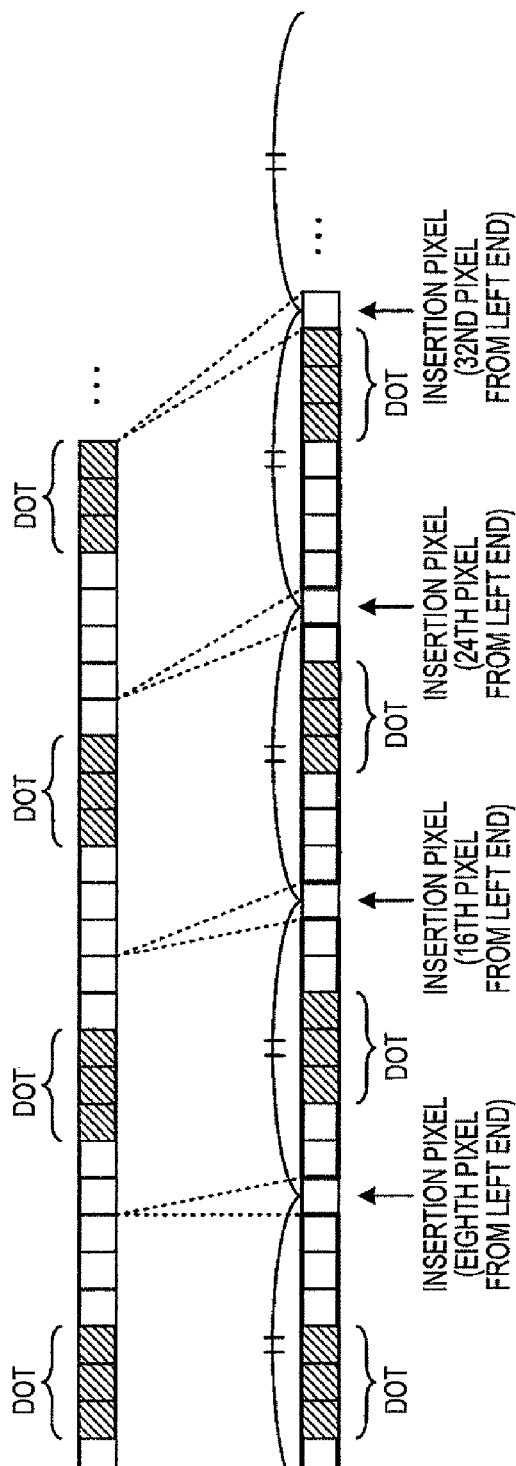
FIGS. 5A and 5B are drawings to show a state before making correction of adding new pixels to pixels of one line and after making corrections of adding new pixels.

FIGS. 5A and 5B show the one-line process target data, FIG. 5A shows a state in which a position shift occurs, and FIG. 5B shows a state in which correction is made by adding pixels so as to become an integral multiple (integer ratio, equal spacing) of the basic arrangement period of dot image.

FIG. 5B shows a state in which the eighth pixel from the first pixel of the leftmost pixel of one line is added, further the 16th pixel from the first pixel of the leftmost pixel is added, further the 24th pixel from the first pixel of the leftmost pixel is added, and further the 32nd pixel from the first pixel of the leftmost pixel is added.

Pixels are added so as to become an integral multiple (integer ratio, equal spacing) of the basic arrangement period of dot image, eight times in the example shown in FIG. 5B.

FIGS. 7A, 7B, 8A, and 8B show applying of the correction processing to each line.

Figure 6:
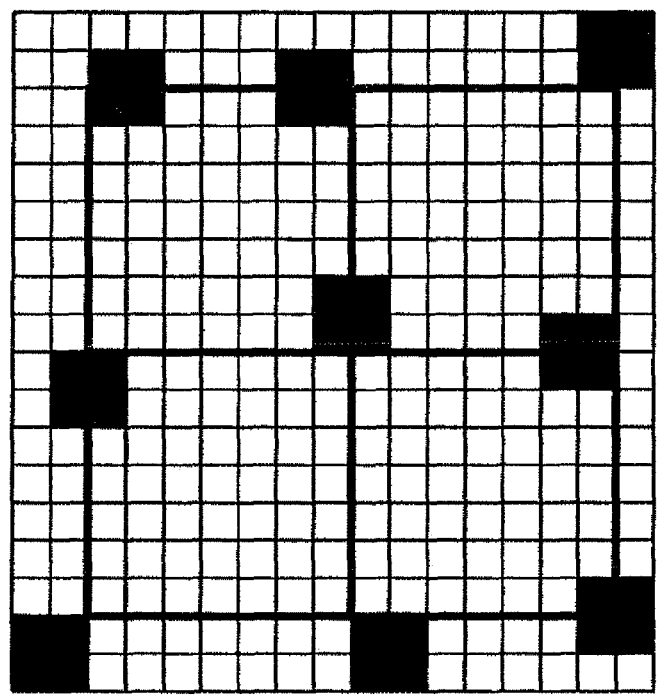
FIG. 6 is a drawing to show a dot image.

FIGS. 7A, 7B, 8A, and 8B are drawings of correcting so that each line in the main scanning direction of the process target data becomes an integral multiple (integer ratio, equal spacing) of the basic arrangement period of dot image for the dot image before correction shown in FIG. 6. One dot is made of four black pixels in FIG. 6.

Figure 7A:
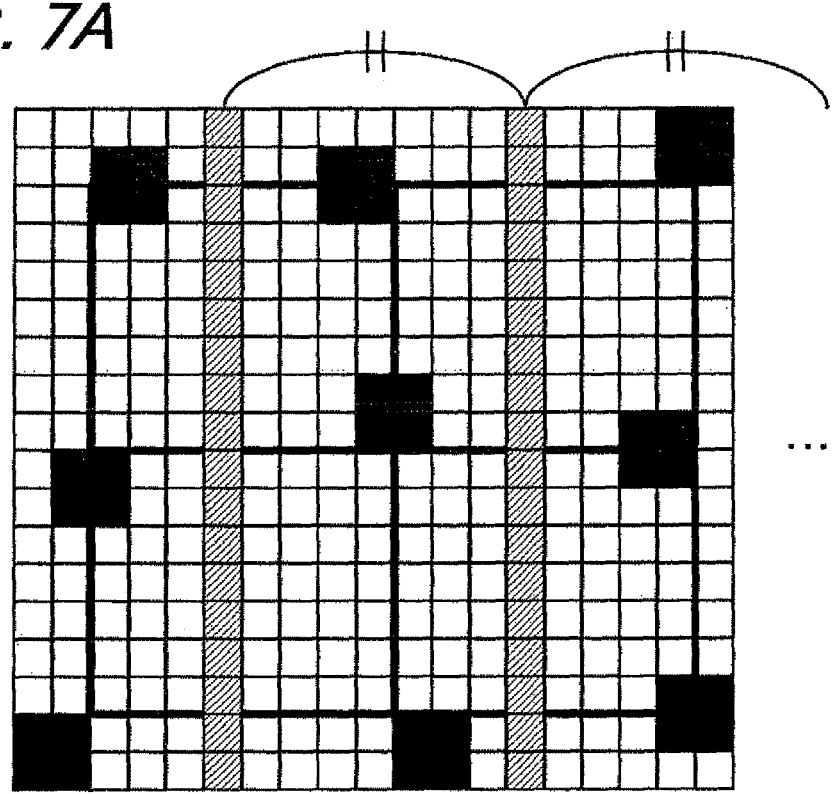
FIGS. 7A and 7B are drawings to show an example wherein new pixels are added to positions not adjacent to and not including a dot pixel.
Figure 7B:
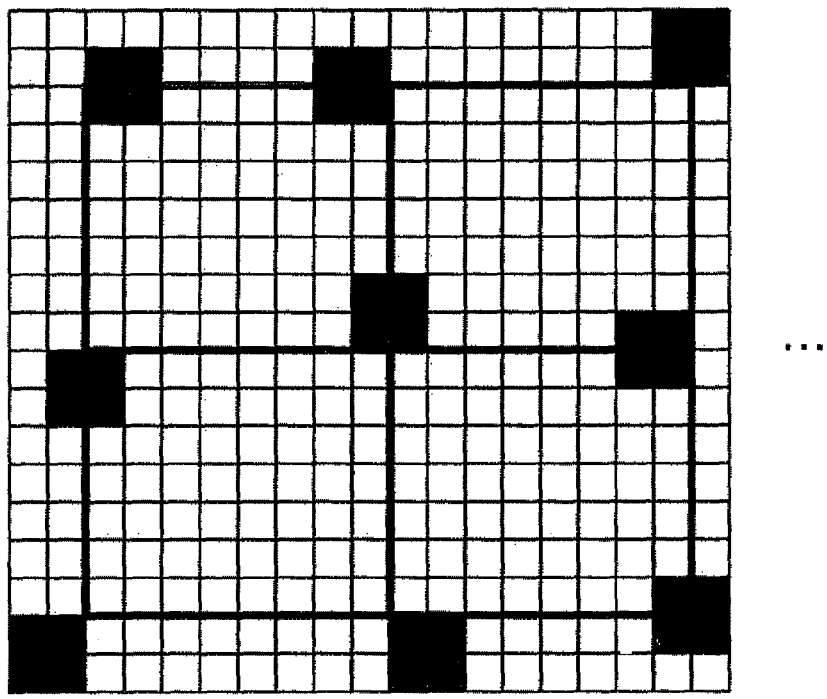

FIG. 7A shows an example wherein a position not adjacent to and not including a black pixel representing a dot is determined a pixel correction position.

In FIG. 7A, the pixel correction positions are the sixth pixel and the 14th pixel from the leftmost pixel of each line and new pixels are added with equal spacing as seven-pixel spacing.

Further, 7B shows an example wherein correction of adding new pixels is made so as to become an integral multiple (integer ratio, equal spacing) of the basic arrangement period of dot image, whereby new pixels are added to spacing of black dot pixel and the same color as the adjacent pixel in the main scanning direction is placed.

Figure 8A:
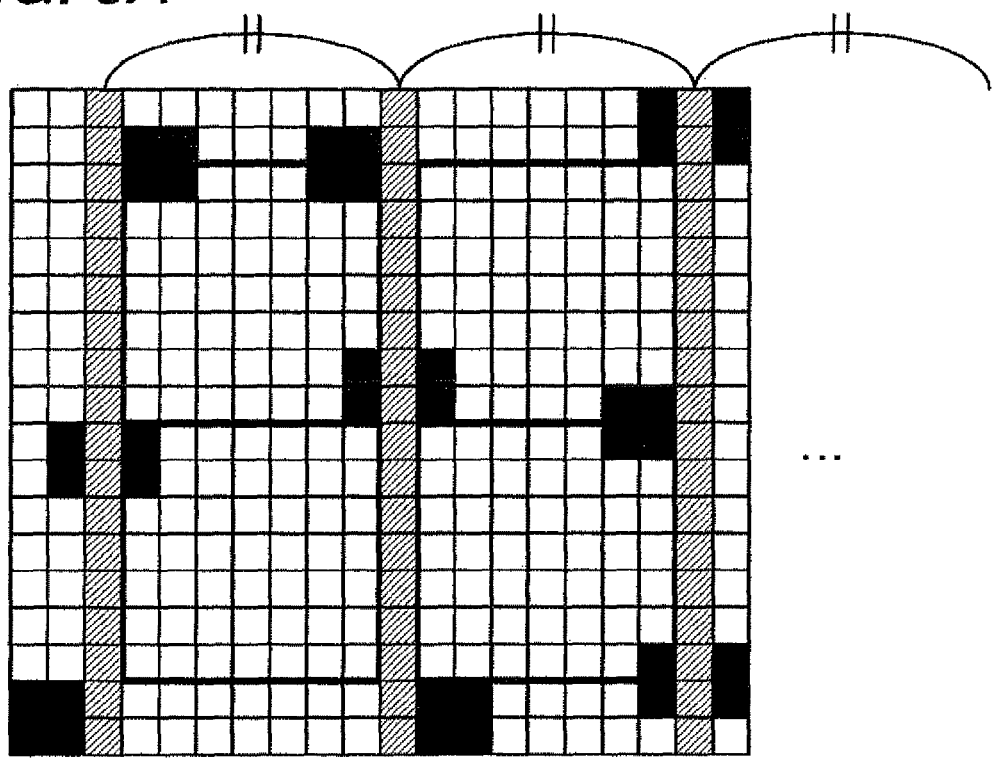
FIGS. 8A and 8B are a drawing to show an example wherein new pixels are added to positions adjacent to or including a dot pixel.
Figure 8B:
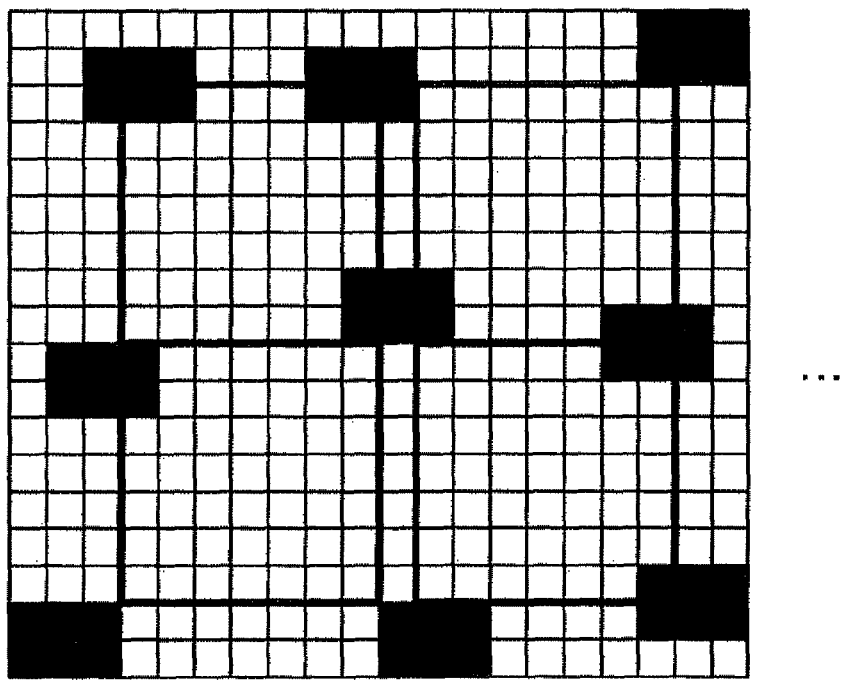

FIG. 8A shows an example wherein a position adjacent to or including a black pixel representing a dot is determined a pixel correction position.

In FIG. 8A, the pixel correction positions are the third pixel, the 11th pixel, and the 19th pixel from the leftmost pixel of each line and new pixels are added with equal spacing as seven-pixel spacing.

Further, 8B shows an example wherein correction of adding new pixels is made so as to become an integral multiple (integer ratio, equal spacing) of the basic arrangement period of dot image, whereby new pixels are added to positions adjacent to or including a black dot pixel and new added pixels are placed in black of dot pixels.

To add pixels as in FIGS. 7A, 7B, 8A, and 8B, the position correction parameter setting section 105 shown in FIG. 1 determines whether or not the number of pixels of each line becomes the same by making correction so as to become an integral multiple of the basic arrangement period of dot image. If the position correction parameter setting section 105 determines that the number of pixels of each line becomes the same, the position correction parameter setting section 105 sets a correction parameter of a pixel correction position, etc., adding a new pixel.

Further, the position correction parameter setting section 105 determines whether or not a new added pixel is adjacent to or divides a dot pixel. If the new added pixel is adjacent to or divides a dot pixel, placing the new added pixel in the same color as the dot is set as a correction parameter. In FIGS. 6, 7A, 7B, 8A, and 8B, the dot pixel is a dot made of a plurality of pixels.

On the other hand, if the new added pixel is not adjacent to and does not include a dot pixel, placing the pixel in the same color as the adjacent pixel in the main scanning direction is set as a correction parameter. Of course, if the adjacent pixel in the main scanning direction is colorless, the new added pixel need not be colored and thus color setting is not made or "colorless" is set.

When the position correction parameter setting section 105 thus sets the correction parameters, a screen parameter setting section 104 sets a screen parameter based on the correction parameter and the screen processing section 101 performs screen processing based on the screen parameter.

A position correction section 102 corrects the binarized processing target data subjected to the screen processing by the screen processing section 101 based on the correction parameter set by the position correction parameter setting section 105, That is, the position correction section 102 adds a new pixel so as to become an integral multiple (integer ratio, equal spacing) of the basic arrangement period of dot image and if the added pixel is adjacent to or includes a dot pixel, places the new added pixel in the same color as the dot pixel; if the added pixel is not adjacent to and does not include a dot pixel, places the new added pixel in the same color as the adjacent pixel.

The position correction section 102 sends the process target data after the correction to an output I/F section 103, which then converts the process target data into an output format in a print output section and stores the data in a storage section if a work area. Further, the print output section is notified that the process target data in the output format is stored in the work area.

Accordingly, the print output section prints out the process target data stored in the work area of the storage section in sequence.

Figure 9:
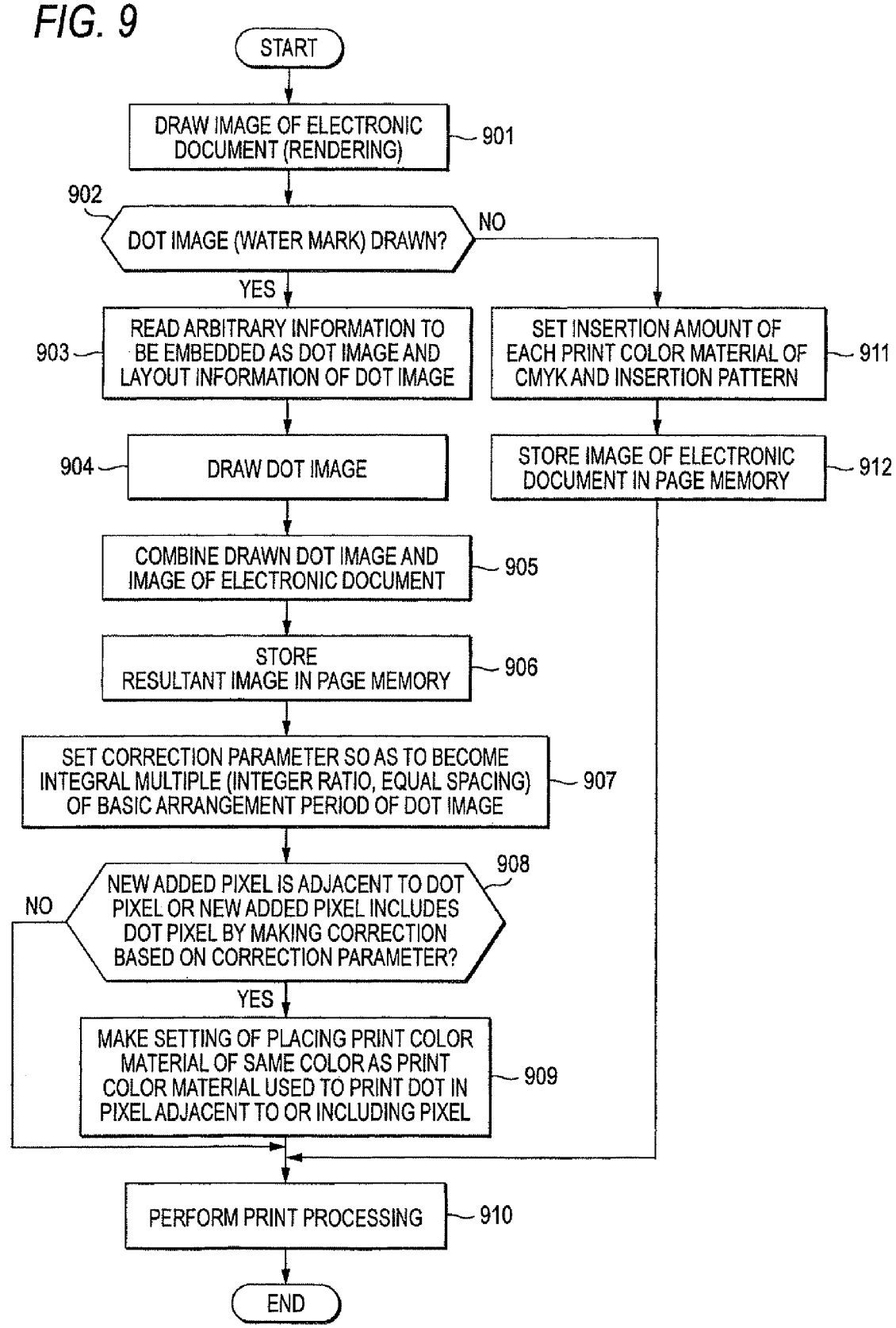
FIG. 9 is a flowchart to show a flow of processing performed by an image forming apparatus in an exemplary embodiment of the invention.

FIG. 9 is a flowchart to show a flow of processing performed by the image forming apparatus in the exemplary embodiment of the invention.

In FIG. 9, when a print command is given, processing is started and an image of an electronic document of target data of print processing is drawing (rendering) (901).

At this time, whether or not print of a dot image (watermark) is specified in the print command is determined (902). If print of a dot image is specified (YES at 902), arbitrary information to be embedded as a dot image and layout information of the dot image are read (903).

The dot image is drawn based on the read information (904).

Subsequently, the drawn dot image and the electronic document are combined (905) and the resultant image is stored in page memory (906).

A correction parameter for making a correction of adding a new pixel so as to become an integral multiple (integer ratio, equal spacing) of the basic arrangement period of dot image is set (907) and a determination is made as to whether or not the new added pixel is adjacent to or includes a dot pixel by making correction based on the correction parameter (908).

If it is determined that the new pixel is adjacent to or includes a dot pixel (YES at 908), a correction parameter for placing the print color material of the same color as the print color material used to print a dot in the pixel adjacent to or including the pixel is set (909).

Print output with position shift corrected using the correction parameters is performed (910).

On the other hand, if print output of a dot image is not specified (NO at 902), correction parameters of correction amounts, etc., of the print color materials of cyan, magenta, yellow, and black used for print output are set (911) and the image of the electronic document is stored in the page memory (912).

The image of the electronic document stored in the page memory is printed out based on the correction amounts of the print color materials and the correction parameters (910).

The exemplary embodiments described above are exemplary embodiments of the invention and the invention is not limited to the exemplary embodiments and may be embodied as appropriate modifications without departing from the sprit and the scope of the invention.

In the invention, the operation described above is executed in an image forming apparatus including a communication function or from a record medium (CD-ROM, DVD-ROM, etc.) storing a program for implementing the means above described, the program is installed in an image forming apparatus and is executed, whereby the image forming apparatus for executing the processing described above may also be configured.

A medium for supplying a program may be a communication medium (a medium for retaining a program temporarily or fluidly like a communication line or a communication system). For example, the program may be put up on a bulletin board system (BBS) of a communication network and may be distributed through a communication line.

The foregoing description of the exemplary embodiment of the present invention has been provided for the purpose of illustration and description. It is not intended to be exhaustive or to limit the invention to the precise forms disclosed. Obviously, many modifications and various will be apparent to practitioners skilled in the art. The embodiments were chosen and described in order to best explain the principles of the invention and its practical application, thereby enabling other skilled in the art to understand the invention for various embodiments and with the various modifications as are suited to the particular use contemplated. It is intended that the scope of the invention be defined by the following claims and their equivalents.

What is claimed is:

1. An image forming apparatus comprising:

an image correction unit that inserts a new pixel between pixels forming image data with a plurality of pixels printed using a plurality of print color materials arranged in a main scanning direction of each print color material of the plurality of print color materials in order to adjust the image width in the main scanning direction of each print color material of the plurality of print color materials; and a determination unit that determines whether or not the image data is specified for printing a watermark representing given information superposed, wherein, when the determination unit determines that the image data is specified for print with a portion of the watermark superposed, a prohibition unit included in the image correction unit prohibits insertion of the new pixel into a pixel string of a print color material of a similar color to the print color material used to print the portion of the watermark, of pixel strings printed using a plurality of print color materials arranged in the main scanning direction of each print color material of the plurality of print color materials, and wherein the prohibition unit prohibits insertion of the new pixel into the pixel string of a print color material only if the new pixel has a similar color to the print color material used to print the portion of the watermark.

2. A non-transitory computer readable medium storing a program causing a computer to execute a process for image forming, the process comprising:

determining whether a print process to print a watermark representing given information superposed on image data is specified; and when the print process is specified, prohibiting insertion of a new pixel into a pixel string of a print color material of a similar color to a print color material used to print a portion of the watermark, of pixel strings printed using a plurality of print color materials arranged in a main scanning direction of each print color material of the plurality of print color materials, and prohibiting insertion of the new pixel into the pixel string of a print color material only if the new pixel has a similar color to the print color material used to print the portion of the watermark.

* * * * *